United States Patent
Zahur et al.

(10) Patent No.: US 11,441,386 B2
(45) Date of Patent: Sep. 13, 2022

(54) PRESSURE BLEED-OFF MODULE FOR OIL AND GAS WELLS

(71) Applicant: Saudi Arabian Oil Company, Dhahran (SA)

(72) Inventors: Jawad Zahur, Abqaiq (SA); Nadeem A. Warraich, Abqaiq (SA); Muhammad A. Hajri, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 177 days.

(21) Appl. No.: 15/930,926

(22) Filed: May 13, 2020

(65) Prior Publication Data
US 2021/0355786 A1    Nov. 18, 2021

(51) Int. Cl.
*E21B 34/08*    (2006.01)
*E21B 41/00*    (2006.01)
*E21B 43/12*    (2006.01)
*F16K 17/164*   (2006.01)

(52) U.S. Cl.
CPC .......... *E21B 34/08* (2013.01); *E21B 41/0021* (2013.01); *E21B 43/12* (2013.01); *F16K 17/164* (2013.01)

(58) Field of Classification Search
CPC ...... E21B 34/08; E21B 41/0021; E21B 43/12; F16K 17/164
USPC ........................................................ 166/316
See application file for complete search history.

(56) References Cited

U.S. PATENT DOCUMENTS

| 5,050,681 A | 9/1991 | Skinner | |
| 5,273,112 A * | 12/1993 | Schultz | .................. E21B 34/16 166/374 |
| 5,316,086 A | 5/1994 | DeMoss | |

(Continued)

FOREIGN PATENT DOCUMENTS

| CN | 110593789 A * | 12/2019 |
| CN | 110593789 A | 12/2019 |
| WO | 2018183861 A1 | 10/2018 |

OTHER PUBLICATIONS

"Different Types of Valves." Chemical Engineering World, Sep. 22, 2019, chemicalengineeringworld.com/different-types-of-valves/. Accessed May 11, 2020. 24 pages.

(Continued)

*Primary Examiner* — Matthew R Buck
*Assistant Examiner* — Patrick F Lambe
(74) *Attorney, Agent, or Firm* — Leason Ellis LLP (57) ABSTRACT

A pressure bleed-off module for an oil well includes: an inlet receiving fluid from an annulus vent of the well; an outlet sending the received fluid to a kill valve of the well; and two paths coupled in parallel between the inlet and the outlet. Each path channels a flow of the received fluid from the inlet to the outlet and includes: a pressure relief valve dividing the path into an inlet side coupled to the inlet and an outlet side coupled to the outlet, opening when the pressure of the fluid in the inlet side exceeds a threshold, and closing when the inlet fluid pressure is below the threshold; pressure gauges measuring the inlet fluid pressure and the pressure of the fluid in the outlet side; a pressure recorder recording the measured inlet and outlet fluid pressures; and a sampling point for draining the fluid in the outlet side.

20 Claims, 3 Drawing Sheets

(56) References Cited

U.S. PATENT DOCUMENTS

| | | | |
|---|---|---|---|
| 6,276,451 B1 * | 8/2001 | Funk | E21B 33/06 166/77.1 |
| 10,612,678 B1 | 4/2020 | Golden et al. | |
| 11,193,349 B1 * | 12/2021 | Dille | F16K 11/0716 |
| 2018/0313187 A1 | 11/2018 | Cummins | |

OTHER PUBLICATIONS

International Search Report and Written Opinion in Corresponding PCT Application No. PCT/US2021/032333, dated Sep. 24, 2021, 11 pages.

* cited by examiner

PRESSURE BLEED-OFF MODULE FOR OIL AND GAS WELLS

FIELD OF THE DISCLOSURE

The present disclosure relates in general to oil and gas wells, and, more specifically, to a pressure bleed-off module for an oil or gas well.

BACKGROUND OF THE DISCLOSURE

In the field of oil and gas wells, newly worked-over or drilled wells can build up pressure in the annular region between the production tubing and the surrounding casing. This region is known as the tubing casing annulus (TCA). Bringing such wells online for production can result in TCA pressure buildup due to, for example, thermal expansion of the TCA fluids. This thermal expansion can result in high pressure which, if not bled off, can compromise the integrity of the well, such as damage the seals, burst the tubing or casing, or dislocate the packer, to name a few.

It is in regard to these and other problems in the art that the present disclosure is directed to provide a technical solution for an effective pressure bleed-off module for an oil or gas well.

SUMMARY OF THE DISCLOSURE

According to an embodiment, a pressure bleed-off module for an oil or gas well is provided. The module comprises: an inlet configured to couple to and receive a fluid from an annulus vent of the oil or gas well; an outlet coupled to the inlet and configured to couple to and send the received fluid to a kill valve of the oil or gas well; and a plurality of paths coupled in parallel between the inlet and the outlet. Each path is configured to channel a flow of the received fluid from the inlet to the outlet and includes: a pressure relief valve (PRV) dividing the path into an inlet side coupled to the inlet and an outlet side coupled to the outlet, and configured to open when the pressure of the received fluid in the inlet side exceeds a threshold and to close when the inlet fluid pressure is below the threshold; a pressure gauge in the inlet side and configured to measure the inlet fluid pressure; a pressure gauge in the outlet side and configured to measure the pressure of the received fluid in the outlet side; a pressure recorder configured to record the measured inlet and outlet fluid pressures; and a sampling point in the outlet side and configured to drain the received fluid in the outlet side.

In an embodiment, each path further includes: an isolation valve in the inlet side and configured to block the fluid flow in the inlet side; and an isolation valve in the outlet side and configured to block the fluid flow in the outlet side.

In an embodiment: the inlet comprises an isolation valve configured to block the received fluid from flowing between the inlet and each of the paths; and the outlet comprises an isolation valve configured to block the received fluid from flowing between each of the paths and the outlet.

In an embodiment: the inlet comprises a vent configured to vent the received fluid from the inlet; and the outlet comprises a vent configured to vent the received fluid from the outlet.

In an embodiment, this pressure bleed-off module is part of a pressure bleed-off system that also comprises a check valve assembly having an inlet configured to couple to and input the sent fluid from the module outlet, and an outlet coupled to the assembly inlet and configured to couple to and output the sent fluid to the kill valve. The check valve assembly is configured to allow the sent fluid to flow from the module outlet to the kill valve, and to block any fluid flow from the kill valve to the module outlet.

In an embodiment, the check valve assembly comprises a plurality of one-way check valves coupled in series between the assembly inlet and the assembly outlet.

In an embodiment, the system further comprises: a first high pressure hose configured to couple the module inlet to the annulus vent; a second high pressure hose configured to couple the assembly outlet to the kill valve; and a third high pressure hose configured to couple the module outlet to the assembly inlet.

According to another embodiment, a pressure bleed-off system for an oil or gas well is provided. The system comprises: a pressure bleed-off module having an inlet configured to couple to and receive a fluid from an annulus vent of the oil or gas well, an outlet coupled to the inlet and configured to couple to and send the received fluid to a kill valve of the oil or gas well, and a path coupled between the inlet and the outlet and configured to channel a flow of the received fluid from the inlet to the outlet; and a check valve assembly having an inlet configured to couple to and input the sent fluid from the module outlet, an outlet coupled to the assembly inlet and configured to couple to and output the sent fluid to the kill valve, and a plurality of one-way check valves coupled in series between the assembly inlet and the assembly outlet and configured to allow the sent fluid to flow from the module outlet to the kill valve, and to block any fluid flow from the kill valve to the module outlet. The path includes: a pressure relief valve (PRV) dividing the path into an inlet side coupled to the inlet and an outlet side coupled to the outlet, and configured to open when the pressure of the received fluid in the inlet side exceeds a threshold and to close when the inlet fluid pressure is below the threshold; an isolation valve in the inlet side and configured to block the fluid flow in the inlet side; a pressure gauge in the inlet side and configured to measure the inlet fluid pressure; a pressure gauge in the outlet side and configured to measure the pressure of the received fluid in the outlet side; a pressure recorder configured to record the measured inlet and outlet fluid pressures; a sampling point in the outlet side and configured to drain the received fluid in the outlet side; and an isolation valve in the outlet side and configured to block the fluid flow in the outlet side.

In an embodiment, the path comprises a plurality of paths coupled in parallel between the module inlet and the module outlet.

In an embodiment: the module inlet comprises an isolation valve configured to block the received fluid from flowing between the inlet and each of the paths; and the module outlet comprises an isolation valve configured to block the received fluid from flowing between each of the paths and the outlet.

In an embodiment: the module inlet comprises a vent configured to vent the received fluid from the module inlet; and the module outlet comprises a vent configured to vent the received fluid from the module outlet.

In an embodiment, the system further comprises: a first high pressure hose configured to couple the module inlet to the annulus vent; a second high pressure hose configured to couple the assembly outlet to the kill valve; and a third high pressure hose configured to couple the module outlet to the assembly inlet.

According to yet another embodiment, an automated method of pressure bleed-off of a fluid from an annulus vent of an oil or gas well to a kill valve of the oil or gas well using a pressure bleed-off module is provided. The method comprises: receiving the annulus vent fluid at an inlet of the module, the inlet being coupled to the annulus vent; channeling, by each of a plurality of paths of the module, a flow of the received fluid from the inlet to an outlet of the module, the paths being coupled in parallel between the inlet and the outlet; and sending the received fluid from the outlet to the kill valve, the outlet being coupled to the kill valve. For each path, channeling the flow includes: dividing the path into an inlet side coupled to the inlet and an outlet side coupled to the outlet using a pressure relief valve (PRV) of the path; opening the PRV when the pressure of the received fluid in the inlet side exceeds a threshold; closing the PRV when the inlet fluid pressure is below the threshold; measuring the inlet fluid pressure using a pressure gauge in the inlet side; measuring the pressure of the received fluid in the outlet side using a pressure gauge in the outlet side; and recording the measured inlet and outlet fluid pressures using a pressure recorder.

In an embodiment, the method further comprises for any path of the parallel paths: blocking the fluid flow in the inlet side using an isolation valve in the inlet side; and blocking the fluid flow in the outlet side using an isolation valve in the outlet side.

In an embodiment, the method further comprises for any path of the parallel paths, draining the received fluid in the outlet side using a sampling point in the outlet side.

In an embodiment, the method further comprises: blocking the received fluid from flowing between the inlet and each of the paths using an isolation valve of the inlet; and blocking the received fluid from flowing between each of the paths and the outlet using an isolation valve of the outlet.

In an embodiment, the method further comprises: venting the received fluid from the inlet using a vent of the inlet; and venting the received fluid from the outlet using a vent of the outlet.

In an embodiment, sending the received fluid comprises: inputting the sent fluid from the module outlet to an inlet of a check valve assembly, the assembly inlet being coupled to the module outlet; outputting the sent fluid to the kill valve from an outlet of the check valve assembly, the assembly outlet being coupled to the assembly input and to the kill valve; allowing the sent fluid to flow from the module outlet to the kill valve using the check valve assembly; and blocking any fluid flow from the kill valve to the module outlet using the check valve assembly.

In an embodiment, allowing the sent fluid to flow from the module outlet to the kill valve and blocking any fluid flow from the kill valve to the module outlet each comprise using a plurality of one-way check valves coupled in series between the assembly inlet and the assembly outlet.

In an embodiment, the method further comprises: coupling the module inlet to the annulus vent using a first high pressure hose; coupling the assembly outlet to the kill valve using a second high pressure hose; and coupling the module outlet to the assembly inlet using a third high pressure hose.

Any combinations of the various embodiments and implementations disclosed herein can be used. These and other aspects and features can be appreciated from the following description of certain embodiments and the accompanying drawings and claims.

It is noted that the drawings are illustrative and not necessarily to scale.

DETAILED DESCRIPTION OF CERTAIN EMBODIMENTS OF THE DISCLOSURE

Example embodiments of the present disclosure are directed to a pressure bleed-off module ("module") or panel for interfacing with the wellhead piping of an oil or gas well ("oil well") at various interface points. The module helps to maintain well integrity and to minimize environmental impact of the well production. In some such embodiments, the module is a modular component of an oil well, capable of easily being moved, repaired, replaced, exchanged, and taken partially or fully offline, and includes various subcomponents. This provides for good flexibility in a variety of different well settings. In some such embodiments, the module provides for a safe and environmentally friendly bleed-off practice, such as for bleeding off an oil well tubing casing annulus (TCA). The module reduces or minimizes environmental impact and reduces or prevents over or under bleeding that otherwise results in well integrity issues. In some such embodiments, the module is part of a pressure bleed-off system ("system") that includes various subcomponents such as high pressure hose connected to the TCA vent on one end, and to the module on the other end. The module includes two parallel paths or channels ("paths") for purposes such as redundancy and bypass. Each path is fitted with a pressure relief valve (PRV), a sampling point, and a pressure recorder. Another high pressure hose connects the module to the wellhead kill valve via two one-way check valves to reduce or prevent back flow tied to the kill valve.

As discussed earlier, in the field of oil and gas wells, newly worked-over or drilled wells can build up pressure in the tubing casing annulus (TCA) between the production tubing and the surrounding casing. Bringing such wells online for production can result in TCA pressure buildup due to, for example, thermal expansion of the TCA fluids. This thermal expansion can result in high pressure which, if not bled off, can compromise the well integrity. One way to address this is to open the TCA gate valve and vent the fluid to the environment (e.g., atmosphere, surrounding land or structures). However, fluids such as inhibited diesel are often used in TCA regions. Venting such fluids to the surrounding environment and structures (e.g., well cellars, well pads) poses many environmental and safety risks. The volume of the vented fluid can vary depending on factors such as the amount of pressure buildup and the volume of the TCA cavity, but in some cases can be quite significant. Atmospheric discharge, or overfilling containment structures, or even using containment structures and the attendant consequences (e.g., contamination, cleanup) can create health and environmental issues. For example, when bleed offs are performed to confirm TCA integrity, the bleed-off fluids can include hydrocarbon gas with hydrogen sulfide ($H_2S$) along with reservoir fluids.

Each of the valves described herein are constructed to include a component that moves between closed and open positions. In the closed position, fluid flow is impeded. In an open position, fluid flow is permitted. In certain valve constructions, movement of the valve can be to intermediate positions such that the valve can be understood as being partially open or incompletely closed. Whenever there is at least a partial opening, fluid flow including venting can pass through the valve structure.

Accordingly, in various example embodiments, a pressure bleed-off module for oil and gas wells is provided. This module provides a safe and environmentally friendly way to bleed off the oil well TCA. For instance, TCAs are often bled off after completion of drilling or workover activity, or to collect representative samples in order to confirm any well integrity issues related to, for example, packers, tubing, and seals, to name a few. In some embodiments, the pressure bleed-off module provides a safe way to reduce or minimize environmental impact and reduce or prevent the over or under bleeding that can result in well integrity issues. The module is part of a mobile pressure-bleed-off system that uses high pressure hose to connect the TCA vent to the module and can be moved from one oil well to another, including various different types and settings of oil and gas wells. The module includes two parallel paths for redundancy, bypass, and the like. Both paths are fitted with pressure relief valves (PRVs), sampling points, and pressure recorders. Another high pressure hose connects the module to the wellhead kill valve through two one-way check valves to effectively prevent back flow from the kill valve.

According to some embodiments, there are redundancy loops in the design and bleed-off ports, with back flow check valves and a number of gauges and pressure recorders to keep the design robust, safe, flexible, and simple. Some embodiments provide solutions to address TCA and other annulus, such as casing-casing annulus (CCA), bleed-offs for newly drilled/workover wells or of well integrity-compromised old wells, in a safe and environmentally friendly manner. In some embodiments, a pressure bleed-off module improves the safety and reliability of the whole operation of the oil well.

In some embodiments, a pressure relief system is provided that is robust in comparison to other solutions in that it incorporates a dual-loop or dual-path system with bleed-off ports as required for specific oil and gas operations. In some embodiments, backflow check valves are included to, for example, provide pressure protection from downstream as well. In some embodiments, an upstream pressure bleed-off system addresses the requirements of TCA/CCA bleed-off operations through use of components such as a dual-bleeder system with back pressure check valves. The pressure bleed-off system provides redundancy in bleed-off operations. The system also prevents against backflow through one-way check valves at the end. The system has isolation valves at the inlet and outlet to control flow. The system has bleed-off ports for sampling. The system has pressure recorders for monitoring pressure changes on the inlet side as well as the outlet side.

In further detail, once the well is started up after drilling or workover, the pressure bleed-off module is hooked up to the TCA on one side and to the kill valve on the other side. The PRVs in each path in the module are set to an appropriate relief pressure, such as 700 pounds per square inch (psi). As such, once thermal expansion of the TCA fluids raises their pressure above 700 psi, the PRVs open and vent the pressure to the kill line, which is almost always is at a lower pressure. The two backflow check valves ensure no flow goes in the backward direction, while the pressure recorders record any pressure changes to track the performance of the module.

In some embodiments, the module reduces or prevents over bleed off, which can otherwise result in an empty TCA (and dislocate the packer or cause other damage). The module also reduces or prevents under bleed off, which can lead to well integrity issues, by using the PRVs instead of human intervention. In some embodiments, the module has no environmental impact as the bleed-off fluid goes to the production plant along with the rest of the production fluids. In some embodiments, there are pressure gauges at each side of each PRV, such as at the TCA and at the vent port (e.g., sample port, drain line) of each path. This can help diagnose downstream blockages, which otherwise can prevent the pressure bleed-off fluid from being vented to the production line. In addition, the sample port in each path in the module helps confirm the quality of the bleed-off fluid while a pressure recorder in each path helps compare the PRV opening/closing performance with that of previous jobs or other such modules or paths.

In some embodiments, the module can also be used in older wells that develop a TCA/tubing communication, such as to provide a safe and environmentally friendly way to perform extended bleed offs, which are often needed to get a representative sample in such circumstances. The bleed-off fluid in such cases can include, for example, hydrogen sulfide ($H_2S$) gas, hydrocarbon gas, and formation oil.

Figure 1:
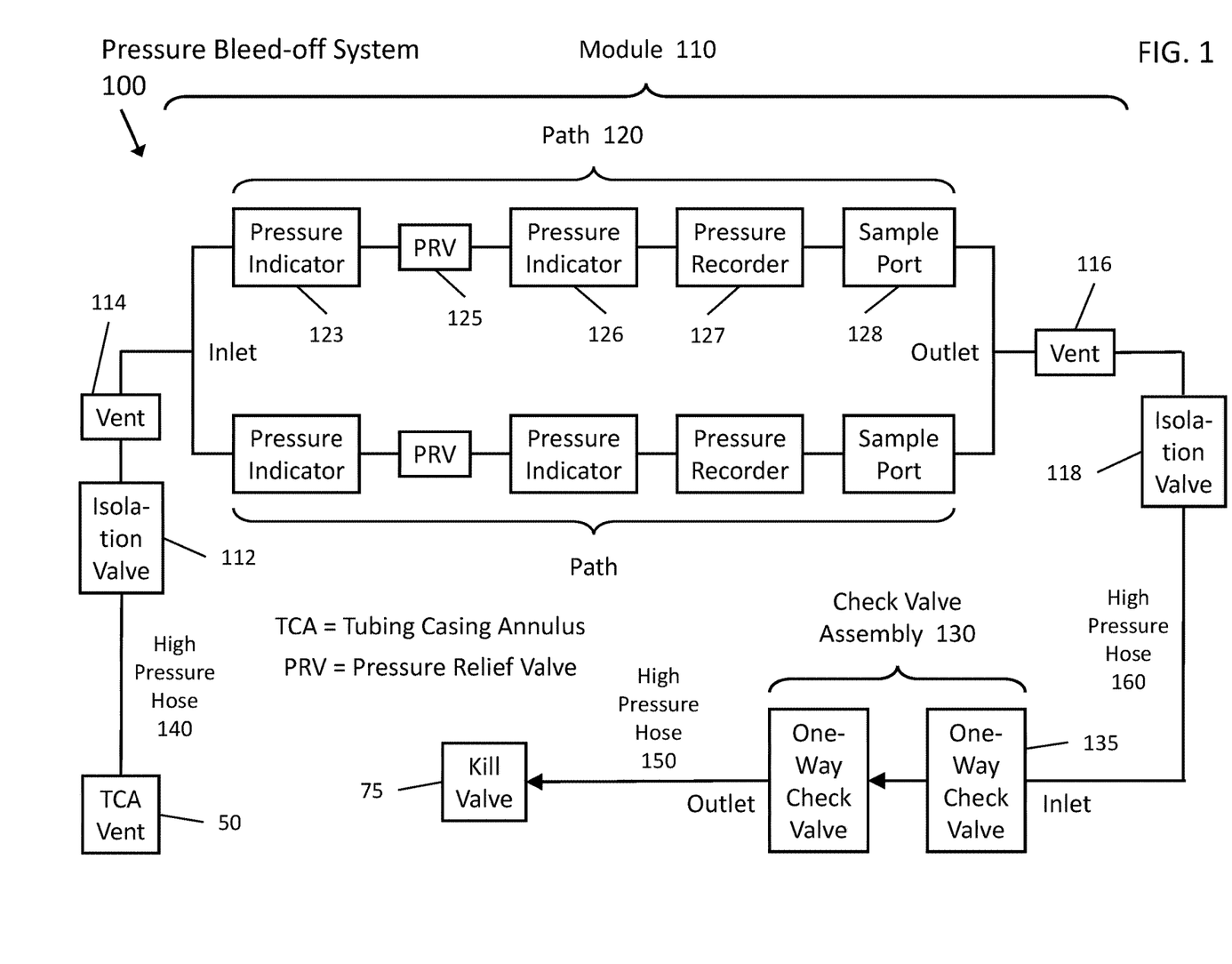
FIG. 1 is block diagram of an example pressure bleed-off system for an oil or gas well, according to an embodiment.

FIG. 1 is block diagram of an example pressure bleed-off system 100 for an oil or gas well, according to an embodiment. The system 100 includes several components, including a pressure bleed-off module 110, a check valve assembly 130, and high pressure hoses 140, 150, and 160 connecting the components to a TCA vent 50 of the oil or gas well, to a kill valve 75 of the oil or gas well, and to each other, respectively.

The pressure bleed-off module 110 has an inlet, an outlet, and one or more pressure bleed-off paths (such as the two pressure bleed-off paths 120 illustrated in FIG. 1) coupled in parallel between the module inlet and the module outlet. The module inlet is configured to couple to and receive a fluid from an annulus vent (such as TCA vent 50) of the oil or gas well. For example, in some embodiments, the module inlet (and module outlet) includes a quick disconnect type connection using a 316 stainless steel (SS) quick coupling rated for 3000 psi or higher. The module outlet is coupled to the module inlet and configured to couple to and send the received fluid to a kill valve (such as kill valve 75) of the oil or gas well. Each path 120 is configured to channel a flow of the received fluid from the module inlet to the module outlet.

Each path 120 includes a pressure relief valve (PRV) 125. The PRV 125 divides the path 120 into an inlet side (e.g., upstream of the PRV 125) coupled to the module inlet and an outlet side (e.g., downstream of the PRV 125) coupled to the module outlet. The PRV 125 is configured to open when the pressure of the received fluid in the inlet side exceeds a threshold (e.g., a set or predetermined threshold) and to close when the inlet fluid pressure is below the threshold. For example, in some embodiments, the PRV 125 is a spring type pressure regulating valve (or spring type precision regulator), with a set point range of 600-750 psig (psi gauge, or pressure relative to ambient atmospheric pressure). Each path 120 further includes (or may include) an isolation valve in the inlet side that is configured to block the fluid flow in the inlet side, and an isolation valve in the outlet side that is configured to block the fluid flow in the outlet side. In some embodiments, these (and other) isolation valves mentioned throughout can be tube fitting ball or gate type isolation valves.

Each path 120 further includes a pressure gauge (such as pressure indicator 123) in the inlet side that is configured to measure the inlet fluid pressure, and a pressure gauge (such as pressure indicator 126) in the outlet side that is configured to measure the pressure of the received fluid in the outlet side. In some embodiments, these pressure gauges or pressure indication assemblies include a tube fitting ball or gate type isolation valve as well as a pressure indicator, such as a 2.5 inch center back mounted glycerin-filled pressure gauge with a range up to 3000 psi (e.g., a WIKA type pressure gauge).

Each path 120 further includes a pressure recorder (such as pressure recorder 127) configured to record the measured inlet and outlet fluid pressures, and a sampling point (such as sample port 128) in the outlet side that is configured to drain or sample {"drain") the received fluid in the outlet side. In some embodiments, the pressure recorder 127 is a Barton Chart Recorder, while the sampling point is a loop drain assembly implemented with a tube fitting ball or gate type isolation valve. In addition, the various tube and fittings used throughout the module 110 can include 316 SS seamless tubing, with ⅜ inch (or larger) outer or outside diameter (OD) and 0.045 inch (or larger) wall thickness.

The check valve assembly 130 (or check valve manifold) has an inlet, an outlet, and a plurality of one-way check valves (such as one-way check valves 135) coupled in series between the assembly inlet and the assembly outlet. The assembly inlet is configured to couple to and input the sent fluid from the module outlet. For example, in some embodiments, the assembly inlet (and assembly outlet) includes a quick disconnect type connection using a 316 SS quick coupling rated for 3000 psi or higher. The assembly outlet is coupled to the assembly inlet and configured to couple to and output the sent fluid to the kill valve 75. The one-way check valves 135 are configured to allow the sent fluid to flow from the module outlet to the kill valve 75, and to block any fluid flow from the kill valve 75 back to the module outlet.

As further illustrated in FIG. 1, in some embodiments, the module inlet includes an isolation valve (such as isolation valve 112) configured to block the received fluid from flowing between the module inlet and each of the paths 120. In some embodiments, the module outlet includes an isolation valve (such as isolation valve 118) configured to block the received fluid from flowing between each of the paths 120 and the module outlet. In some embodiments, the module inlet includes a vent (such as vent 114) configured to vent the received fluid from the module inlet. In some embodiments, the module outlet includes a vent (such as vent 116) configured to vent the received fluid from the module outlet. For example, in some such embodiments, the module inlet and the module outlet include a vent assembly for venting the module 110 after use. The vent assembly can include a tube fitting ball or gate type isolation valve.

In some embodiments, the pressure bleed-off system 100 further includes a high pressure hose (such as high pressure hose 140) configured to couple the module inlet to the annulus vent 50, a high pressure hose (such as high pressure hose 150) configured to couple the assembly outlet to the kill valve 75, and a high pressure hose (such as high pressure hose 160) configured to couple the module outlet to the assembly inlet. In some such embodiments, the high pressure hose is a steel wire reinforced hydraulic hose with a working pressure of at least 3000 psi and a minimum burst pressure of at least 12,000 psi.

In some embodiments, the pressure bleed-off system 100 is portable and can be moved between oil wells. The module 110 can be connected to the TCA vent 50 by removing a threaded plug of the TCA vent 50, installing a threaded quick disconnect coupling connector on the TCA vent 50, and connecting the TCA vent connection to the inlet of the module 110 using high pressure hose 140. The module 110 can be connected to the check valve assembly 130 by connecting the outlet of the module 110 to the inlet of the check valve assembly 130 using high pressure hose 160. The check valve assembly 130 can be connected to the kill valve 75 by removing a threaded plug from the kill valve 75, installing a threaded quick disconnect coupling connector on the kill valve 75, and connecting the outlet of the check valve assembly 130 to the kill valve connection using high pressure hose 150. In some embodiments, the check valve assembly 130 is placed as close as possible (or practical) to the kill valve connection (e.g., to reduce or minimize the amount of back pressure exiting through the kill valve 75).

Figure 2:
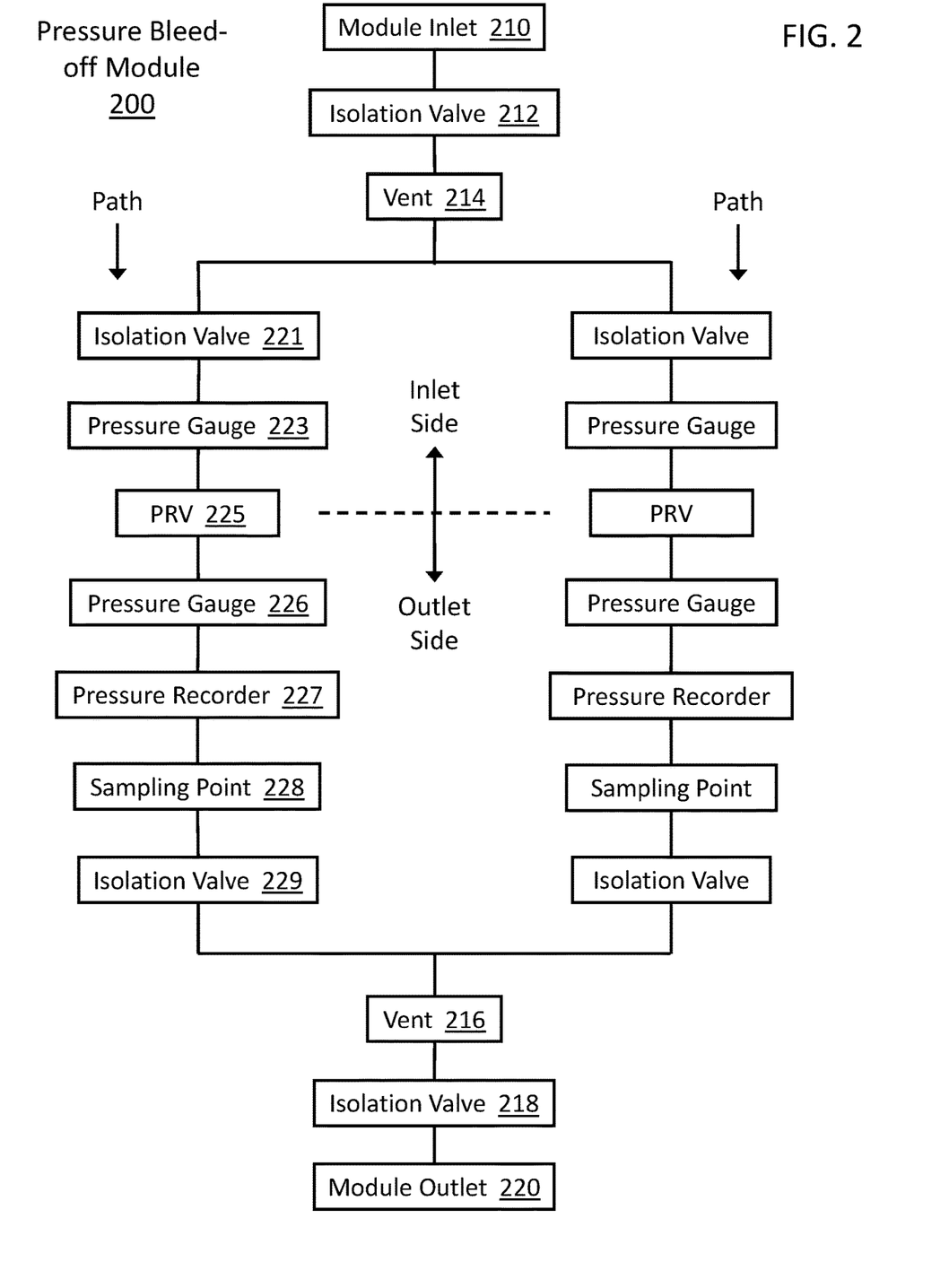
FIG. 2 is block diagram of an example pressure bleed-off module for an oil or gas well, according to an embodiment.

FIG. 2 is block diagram of an example pressure bleed-off module 200 for an oil or gas well, according to an embodiment. The pressure bleed-off module 200 is for bleeding off pressure (such as annulus pressure) in an oil or gas well. The module 200 can be used, for example, in the pressure bleed-off system 100 of FIG. 1. The subcomponents of the module 200 can be the same or similar to the subcomponents of the system 100. Accordingly, for ease of description, some of the details described above with reference to the subcomponents of FIG. 1 are equally applicable to the subcomponents of module 200 of FIG. 2 and will not be repeated.

In further detail, the pressure bleed-off module 200 includes an inlet 210 configured to couple to and receive a fluid from an annulus vent of the oil or gas well, and an outlet 220 coupled to the inlet 210 and configured to couple to and send the received fluid to a kill valve of the oil or gas well. The module 200 further includes a plurality of paths coupled in parallel between the inlet 210 and the outlet 220. For instance, FIG. 2 illustrates two such paths (or loops), oriented vertically side by side. Each path is configured to channel a flow of the received fluid from the inlet 210 to the outlet 220. Each path includes a pressure relief valve (PRV) 225 dividing the path into an inlet (upstream) side coupled to the inlet 210 and an outlet (downstream) side coupled to the outlet 220. Each PRV 225 is configured to open when the pressure of the received fluid in the inlet side exceeds a set or predetermined threshold, and to close when the inlet fluid pressure is below the threshold.

The inlet side of each path includes a pressure gauge 223 configured to measure the inlet fluid pressure. Likewise, the outlet side of each path includes a pressure gauge 226 configured to measure the pressure of the received fluid in the outlet side. In addition, the outlet side of each path includes a pressure recorder 227 configured to record the measured inlet and outlet fluid pressures, and a sampling point 228 (or sample port) configured to drain or sample the received fluid in the outlet side. In some embodiments, the pressure recorder 227 is located on the inlet side (or there is a dedicated pressure recorder on each side of the PRV 225).

In some embodiments, each path further includes an isolation valve 221 in the inlet side that is configured to block the fluid flow in the inlet side, and an isolation valve 229 in the outlet side that is configured to block the fluid flow in the outlet side. The isolation valves 221 and 229 in each path allow that path to be taken offline or isolated from the other paths, such as for performing maintenance, diagnostics, or sampling of the path. In some embodiments, the inlet 210 includes an isolation valve 212 configured to block the received fluid from flowing between the inlet 210 and each of the paths, and the outlet 220 includes an isolation valve 218 configured to block the received fluid from flowing between each of the paths and the outlet 220. The module isolation valves 212 and 218 allow the whole module 220 to be taken offline or isolated from the rest of the wellhead. In some embodiments, the inlet 210 includes a vent 214 configured to vent the received fluid from the inlet 210, and the outlet 220 includes a vent 216 configured to vent the received fluid from the outlet 220.

Figure 3:
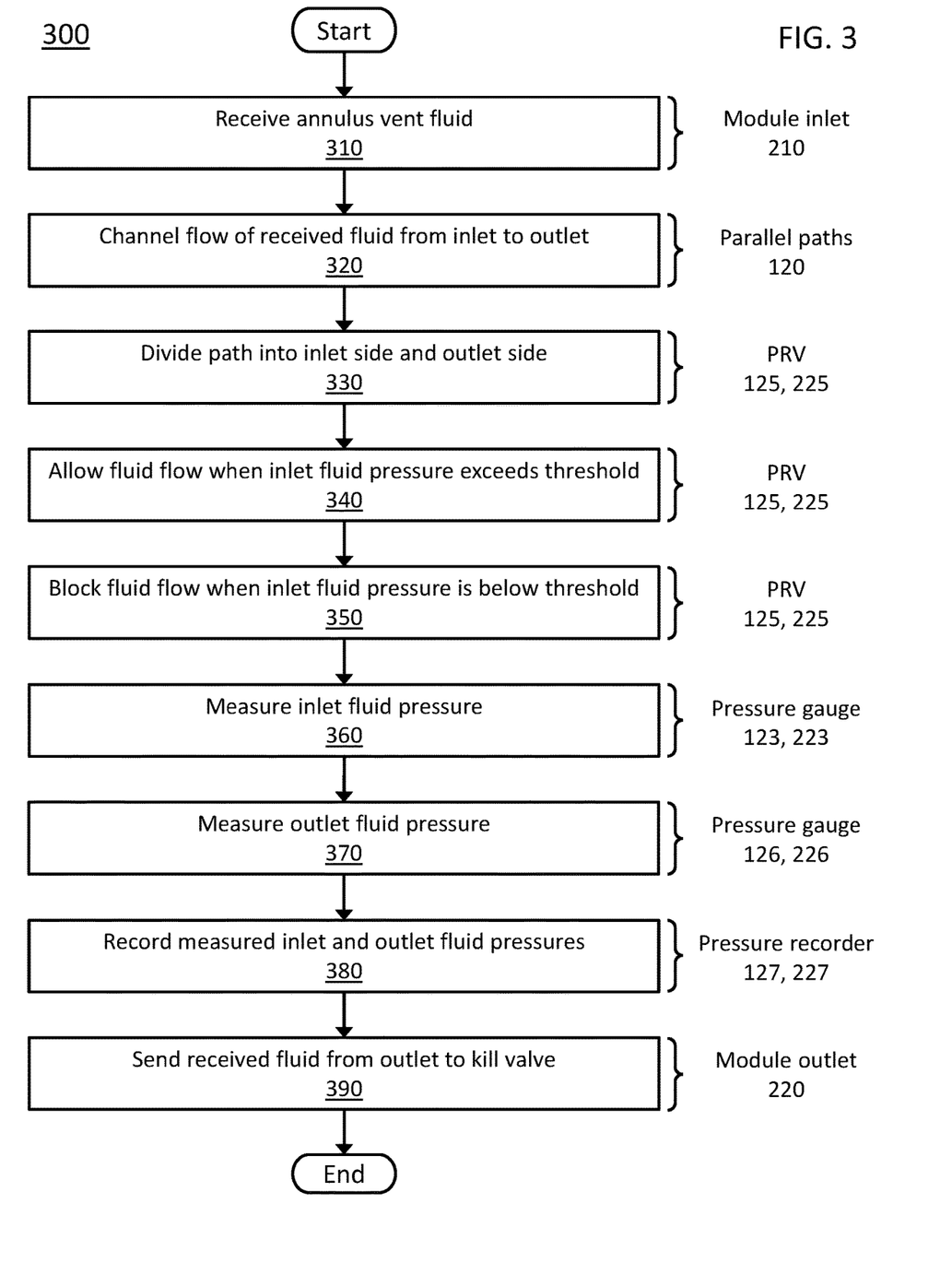
FIG. 3 is a flow diagram of an example method of bleeding off pressure buildup for an oil or gas well, such as with the pressure bleed-off system of FIG. 1 or the pressure bleed-off module of FIG. 2, according to an embodiment.

FIG. 3 is a flow diagram of an example automated method 300 of bleeding off pressure buildup for an oil or gas well, such as with the pressure bleed-off system 100 of FIG. 1 or the pressure bleed-off module 200 of FIG. 2, according to an embodiment. The pressure bleed-off is of a fluid (such as inhibited diesel) from an annulus vent (such as TCA vent 50) of an oil or gas well to a kill valve (such as kill valve 75) of the oil or gas well using a pressure bleed-off module (such as pressure bleed-off module 110 or 200).

Some or all of the method 300 can be performed using components and techniques illustrated in FIGS. 1-2. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 300 (or other disclosed method) to be carried out. It should be noted that in other embodiments, the order of the operations can be varied, and that some of the operations can be omitted.

In the example method 300, processing begins with the step of receiving 310 the annulus vent fluid at an inlet (such as module inlet 210) of the module. Here, the inlet is coupled to the annulus vent. The method 300 further includes the step of channeling 320, by each of a plurality of paths (such as parallel paths 120) of the module, a flow of the received fluid from the inlet to an outlet (such as module outlet 220) of the module. The paths are coupled in parallel between the inlet and the outlet.

In further detail, for each path, the step of channeling 320 the flow includes the step of dividing 330 the path into an inlet side coupled to the inlet and an outlet side coupled to the outlet using a pressure relief valve (PRV, such as PRV 125 or 225) of the path. The channeling 320 further includes the steps of opening 340 the PRV to allow the fluid flow when the pressure of the received fluid in the inlet side exceeds a threshold (such as 700 psi), and closing 350 the PRV to block the fluid flow when the inlet fluid pressure is below the threshold. In addition, the channeling 320 includes the steps of measuring 360 the inlet fluid pressure using a pressure gauge (such as pressure gauge 123 or 223) in the inlet side, and measuring 370 the pressure of the received fluid in the outlet side using a pressure gauge (such as pressure gauge 126 or 226) in the outlet side. The channeling 320 also includes the step of recording 380 the measured inlet and outlet fluid pressures using a pressure recorder (such as pressure recorder 127 or 227). The method 300 further includes the step of sending 390 the received fluid from the outlet to the kill valve. Here, the outlet is coupled to the kill valve.

In some embodiments, the method 300 further includes for any path of the parallel paths, the steps of blocking the fluid flow in the inlet side using an isolation valve (such as isolation valve 221) in the inlet side, and blocking the fluid flow in the outlet side using an isolation valve (such as isolation valve 229) in the outlet side. In some embodiments, the method 300 further includes for any path of the parallel paths, the step of draining the received fluid in the outlet side using a sampling point (such as sample port 128 or sampling point 228) in the outlet side. In some embodiments, the method 300 further includes the steps of blocking the received fluid from flowing between the inlet and each of the paths using an isolation valve (such as isolation valve 112 or 212) of the inlet, and blocking the received fluid from flowing between each of the paths and the outlet using an isolation valve (such as isolation valve 118 or 218) of the outlet. In some embodiments, the method 300 further includes the steps of venting the received fluid from the inlet using a vent (such as vent 114 or vent 214) of the inlet, and venting the received fluid from the outlet using a vent (such as vent 116 or 216) of the outlet.

In further detail, in some embodiments, the step of sending 390 the received fluid from the outlet to the kill valve includes the steps of inputting the sent fluid from the module outlet to an inlet of a check valve assembly (such as check valve assembly 130), the assembly inlet being coupled to the module outlet, and outputting the sent fluid to the kill valve from an outlet of the check valve assembly, the assembly outlet being coupled to the assembly input and to the kill valve. In some such embodiments, the sending 390 further includes the steps of allowing the sent fluid to flow from the module outlet to the kill valve using the check valve assembly, and blocking any fluid flow from the kill valve to the module outlet using the check valve assembly. In some such embodiments, the steps of allowing the sent fluid to flow from the module outlet to the kill valve and blocking any fluid flow from the kill valve to the module outlet each include the step of using a plurality of one-way check valves (such as one-way check valves 135) coupled in series between the assembly inlet and the assembly outlet.

In some embodiments, the method 300 further includes the steps of coupling the module inlet to the annulus vent using a first high pressure hose (such as high pressure hose 140), coupling the assembly outlet to the kill valve using a second high pressure hose (such as high pressure hose 150), and coupling the module outlet to the assembly inlet using a third high pressure hose (such as high pressure hose 160).

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the scope of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. A pressure bleed-off module for an oil or gas well, the module comprising:
    an annulus vent of the oil or gas well;
    a kill valve of the oil or gas well;
    an inlet coupled to and configured to receive a fluid from the annulus vent;
    an outlet coupled to the inlet and the kill valve, and configured to send the received fluid to the kill valve; and
    a plurality of paths coupled in parallel between the inlet and the outlet, each path being configured to channel a flow of the received fluid from the inlet to the outlet, each path including:
        a pressure relief valve (PRV) dividing the path into an inlet side coupled to the inlet and an outlet side coupled to the outlet, and configured to open when the pressure of the received fluid in the inlet side exceeds a threshold and to close when the inlet fluid pressure is below the threshold;
        a pressure gauge in the inlet side and configured to measure the inlet fluid pressure;
        a pressure gauge in the outlet side and configured to measure the pressure of the received fluid in the outlet side;
        a pressure recorder configured to record the measured inlet and outlet fluid pressures; and
        a sampling point in the outlet side and configured to drain the received fluid in the outlet side.

2. The module of claim 1, wherein each path further includes:
    an isolation valve in the inlet side and configured to block the fluid flow in the inlet side; and
    an isolation valve in the outlet side and configured to block the fluid flow in the outlet side.

3. The module of claim 1, wherein:
    the inlet comprises an isolation valve configured to block the received fluid from flowing between the inlet and each of the paths; and
    the outlet comprises an isolation valve configured to block the received fluid from flowing between each of the paths and the outlet.

4. The module of claim 1, wherein:
    the inlet comprises a vent configured to vent the received fluid from the inlet; and
    the outlet comprises a vent configured to vent the received fluid from the outlet.

5. A pressure bleed-off system comprising:
    the pressure bleed-off module of claim 1; and
    a check valve assembly having an inlet configured to couple to and input the sent fluid from the module outlet, and an outlet coupled to the assembly inlet and configured to couple to and output the sent fluid to the kill valve, wherein the check valve assembly is configured to allow the sent fluid to flow from the module outlet to the kill valve, and to block any fluid flow from the kill valve to the module outlet.

6. The system of claim 5, wherein the check valve assembly comprises a plurality of one-way check valves coupled in series between the assembly inlet and the assembly outlet.

7. The system of claim 5, further comprising:
    a first high pressure hose configured to couple the module inlet to the annulus vent;
    a second high pressure hose configured to couple the assembly outlet to the kill valve; and
    a third high pressure hose configured to couple the module outlet to the assembly inlet.

8. A pressure bleed-off system for an oil or gas well, the system comprising:
    a pressure bleed-off module having an annulus vent of the oil or gas well, an inlet coupled to and configured to receive a fluid from the annulus vent, a kill valve of the oil or gas well, an outlet coupled to the inlet and the kill valve and configured to send the received fluid to the kill valve, and a path coupled between the inlet and the outlet and configured to channel a flow of the received fluid from the inlet to the outlet, wherein the path includes
        a pressure relief valve (PRV) dividing the path into an inlet side coupled to the inlet and an outlet side coupled to the outlet, and configured to open when the pressure of the received fluid in the inlet side exceeds a threshold and to close when the inlet fluid pressure is below the threshold,
        an isolation valve in the inlet side and configured to block the fluid flow in the inlet side,
        a pressure gauge in the inlet side and configured to measure the inlet fluid pressure,
        a pressure gauge in the outlet side and configured to measure the pressure of the received fluid in the outlet side, a pressure recorder configured to record the measured inlet and outlet fluid pressures, a sampling point in the outlet side and configured to drain the received fluid in the outlet side, and an isolation valve in the outlet side and configured to block the fluid flow in the outlet side; and a check valve assembly having an inlet configured to couple to and input the sent fluid from the module outlet, an outlet coupled to the assembly inlet and configured to couple to and output the sent fluid to the kill valve, and a plurality of one-way check valves coupled in series between the assembly inlet and the assembly outlet and configured to allow the sent fluid to flow from the module outlet to the kill valve, and to block any fluid flow from the kill valve to the module outlet.

9. The system of claim 8, wherein the path comprises a plurality of paths coupled in parallel between the module inlet and the module outlet.

10. The system of claim 9, wherein:

the module inlet comprises an isolation valve configured to block the received fluid from flowing between the inlet and each of the paths; and the module outlet comprises an isolation valve configured to block the received fluid from flowing between each of the paths and the outlet.

11. The system of claim 8, wherein:

the module inlet comprises a vent configured to vent the received fluid from the module inlet; and the module outlet comprises a vent configured to vent the received fluid from the module outlet.

12. The system of claim 8, further comprising:

a first high pressure hose configured to couple the module inlet to the annulus vent;

a second high pressure hose configured to couple the assembly outlet to the kill valve; and a third high pressure hose configured to couple the module outlet to the assembly inlet.

13. An automated method of pressure bleed-off of a fluid from an oil or gas well using a pressure bleed-off module including an annulus vent of the oil or gas well and a kill valve of the oil or gas well, the method comprising:

receiving the fluid from the annulus vent at an inlet of the module, the inlet being coupled to the annulus vent;

channeling, by each of a plurality of paths of the module, a flow of the received fluid from the inlet to an outlet of the module, the paths being coupled in parallel between the inlet and the outlet; and sending the received fluid from the outlet to the kill valve, the outlet being coupled to the kill valve, wherein, for each path, channeling the flow includes:

dividing the path into an inlet side coupled to the inlet and an outlet side coupled to the outlet using a pressure relief valve (PRV) of the path;

opening the PRV when the pressure of the received fluid in the inlet side exceeds a threshold;

closing the PRV when the inlet fluid pressure is below the threshold;

measuring the inlet fluid pressure using a pressure gauge in the inlet side;

measuring the pressure of the received fluid in the outlet side using a pressure gauge in the outlet side; and recording the measured inlet and outlet fluid pressures using a pressure recorder.

14. The method of claim 13, further comprising for any path of the parallel paths:

blocking the fluid flow in the inlet side using an isolation valve in the inlet side; and blocking the fluid flow in the outlet side using an isolation valve in the outlet side.

15. The method of claim 13, further comprising for any path of the parallel paths, draining the received fluid in the outlet side using a sampling point in the outlet side.

16. The method of claim 13, further comprising:

blocking the received fluid from flowing between the inlet and each of the paths using an isolation valve of the inlet; and blocking the received fluid from flowing between each of the paths and the outlet using an isolation valve of the outlet.

17. The method of claim 13, further comprising:

venting the received fluid from the inlet using a vent of the inlet; and venting the received fluid from the outlet using a vent of the outlet.

18. The method of claim 13, wherein sending the received fluid comprises:

inputting the sent fluid from the module outlet to an inlet of a check valve assembly, the assembly inlet being coupled to the module outlet;

outputting the sent fluid to the kill valve from an outlet of the check valve assembly, the assembly outlet being coupled to the assembly input and to the kill valve;

allowing the sent fluid to flow from the module outlet to the kill valve using the check valve assembly; and blocking any fluid flow from the kill valve to the module outlet using the check valve assembly.

19. The method of claim 18, wherein allowing the sent fluid to flow from the module outlet to the kill valve and blocking any fluid flow from the kill valve to the module outlet each comprise using a plurality of one-way check valves coupled in series between the assembly inlet and the assembly outlet.

20. The method of claim 18, further comprising:

coupling the module inlet to the annulus vent using a first high pressure hose;

coupling the assembly outlet to the kill valve using a second high pressure hose; and coupling the module outlet to the assembly inlet using a third high pressure hose.

* * * * *